United States Patent
McCoy

(10) Patent No.: US 7,658,669 B2
(45) Date of Patent: Feb. 9, 2010

(54) AIRCRAFT CABIN PRESSURE CONTROLS WITH AN OPEN-LOOP MOTOR CONTROL SYSTEM: NON-LINEAR CONTROL LAW LOGIC TO COMPENSATE FOR EXCESSIVE MOTOR LOADS OR MOTOR DEGRADATION

(75) Inventor: Gerard L. McCoy, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 399 days.

(21) Appl. No.: 11/673,100

(22) Filed: Feb. 9, 2007

(65) Prior Publication Data

US 2008/0194191 A1 Aug. 14, 2008

(51) Int. Cl.
*B64D 13/02* (2006.01)
(52) U.S. Cl. .............. 454/71; 454/70; 454/72; 454/74; 454/75; 454/76
(58) Field of Classification Search .......... 454/71, 454/74, 76
See application file for complete search history.

(56) References Cited

U.S. PATENT DOCUMENTS

| | | | |
|---|---|---|---|
| 4,164,896 A | * | 8/1979 | Aldrich ............ 454/72 |
| 4,694,390 A | | 9/1987 | Lee |
| 5,238,220 A | * | 8/1993 | Shell et al. ............ 251/67 |
| 5,297,987 A | * | 3/1994 | Emmons et al. ............ 454/74 |
| 5,543,696 A | | 8/1996 | Huggett et al. |
| 6,962,324 B2 | | 11/2005 | Bunn et al. |
| 6,979,257 B2 | | 12/2005 | Horner et al. |

\* cited by examiner

*Primary Examiner*—Marvin Lateef
*Assistant Examiner*—Brittany Towns
(74) *Attorney, Agent, or Firm*—Oral Caglar, Esq.

(57) ABSTRACT

A cabin pressure control system (CPCS) software control logic modification may boost the voltage applied to a motor when conditions are sensed indicating a combination of larger than normal cabin pressure and cabin rate error conditions. The motor may be part of an open-loop system for operating a butterfly valve that may regulate outflow from the aircraft cabin. The larger than normal cabin pressure and cabin rate error conditions may be an indication that the outflow valve is not responding in a normal manner, potentially caused by excessive loading to the motor or motor degradation. By boosting the motor voltage during excessive load conditions or with a degraded motor, CPCS performance and robustness may be improved.

20 Claims, 6 Drawing Sheets

AIRCRAFT CABIN PRESSURE CONTROLS WITH AN OPEN-LOOP MOTOR CONTROL SYSTEM: NON-LINEAR CONTROL LAW LOGIC TO COMPENSATE FOR EXCESSIVE MOTOR LOADS OR MOTOR DEGRADATION

BACKGROUND OF THE INVENTION

The present invention generally relates to an aircraft cabin pressure control system and method and, more specifically, to systems and methods for controlling aircraft cabin pressure with an open-loop motor control system by applying non-linear control logic to compensate for excessive motor loads or motor degradation.

For a given airspeed, an aircraft may consume less fuel at a higher altitude than it does at a lower altitude. In other words, an aircraft may be more efficient in flight at higher altitudes as compared to lower altitudes. Moreover, bad weather and turbulence can sometimes be avoided by flying above such weather or turbulence. Thus, because of these and other potential advantages, many aircraft are designed to fly at relatively high altitudes. The altitude to which an aircraft may fly is, in many instances, limited to a maximum certified altitude.

As the altitude of an aircraft increases from its take-off altitude to its "top of climb" or "cruise" altitude, the ambient atmospheric pressure outside of the aircraft decreases. Thus, unless otherwise controlled, air could leak out of the aircraft cabin causing it to decompress to an undesirably low pressure at high altitudes. If the pressure in the aircraft cabin is too low, the aircraft passengers may suffer hypoxia, which is a deficiency of oxygen concentration in human tissue. The response to hypoxia may vary from person to person, but its effects generally include drowsiness, mental fatigue, headache, nausea, euphoria, and diminished mental capacity.

Aircraft cabin pressure is often referred to in terms of "cabin pressure altitude," which refers to the normal atmospheric pressure existing at a certain altitude. Studies have shown that the symptoms of hypoxia may become noticeable when the cabin pressure altitude is above the equivalent of the atmospheric pressure one would experience outside at 8,000 feet. Thus, many aircraft are equipped with a cabin pressure control system (CPCS) which functions to, among other things, maintain the cabin pressure altitude to within a relatively comfortable range (e.g., at or below approximately 8,000 feet), allow gradual changes in the cabin pressure altitude to minimize passenger discomfort and maintain cabin-to-atmosphere differential pressure below nominal and maximum limits. Thus, many cabin pressure control systems control cabin altitude as a function of aircraft altitude, and do so in a manner and rate that will keep the cabin-to-atmosphere differential pressure less than the nominal limit.

Conventional cabin pressure control systems are designed to exhaust cabin air during flight in order to comfortably and safely pressurize the fuselage (cabin) so that high altitude aircraft flight can occur. Conventional CPCS design may utilize an electromechanically controlled outflow valve that is modulated to control the outflow of air from the cabin, thereby controlling cabin pressure. The electromechanically controlled outflow valve is comprised of an embedded software controller that spins a motor which drives a geartrain connected to a butterfly valve. In a typical, prior art, conventional CPCS design, a brushed motor is spun in an open-loop drive scheme, that is, by applying a voltage directly across the motor terminals, without using speed feedback as a control parameter. Without the benefit of speed feedback as a control parameter, motor speed response can degrade if the load applied to the motor is excessive (larger than anticipated) of if motor performance degrades significantly over time. If motor response degradation occurs, CPCS control could be erratic, potentially leading to customer dissatisfaction.

Referring to FIG. 1, there is shown a control law logic 10 for a conventional CPCS according to the prior art. The input variable is the cabin rate error 12, which is the cabin rate command (not shown) minus the cabin rate actual (not shown). Generally, the term "cabin rate" refers to the change in cabin altitude relative to sea level, often expressed in sea level feet per minute (slfpm). The cabin rate command refers to a commanded rate of change in cabin altitude. Often, it is desirable to have a relatively small cabin rate command so that passengers in the aircraft cabin may not notice sudden changes in cabin pressure that may be associated with sudden changes in cabin altitude.

The cabin rate error 12 may be operated upon by a proportional-integral (PI) control scheme as designated by the dotted block 14. The PI control scheme 14 may use a constant integrator gain 16, as indicated by the gain value of 0.000015 ((duty-cycle/second)/cabin_rate_error (slfpm)) in FIG. 1. Conventional gain values may change for different applications, however, in conventional CPCS design, the gain value, once set for the application, is fixed within the control logic.

The cabin rate error 12 may be multiplied by the gain 16 and then integrated. The integrator output (the integral duty cycle command 18) may be limited to +/−0.025, which equates to a +/−2.5% duty cycle command. A proportional duty cycle command 20, as is known in the art, may be summed with the integral duty cycle command 18 to provide an unlimited duty cycle command 22. This unlimited duty cycle command 22 may correspond to a certain voltage being applied directly to a motor to regulate a butterfly valve (not shown), as discussed above, in an open-loop system.

The conventional logic 10 may result in erratic CPCS control should there be excessive loads on the motor or should the motor experience degradation.

As can be seen, there is a need for an open-loop control logic and method that may compensate for excessive motor loads or motor degradation while appropriately regulating cabin air pressure.

SUMMARY OF THE INVENTION

In one aspect of the present invention, a control logic for a cabin pressure control system comprises an integrator, the integrator receiving the product of a cabin rate error and an integrator gain to provide an integral duty cycle command, the integrator having a saturation limit delimited by a duty cycle limit; an integrator gain look-up table providing the integrator gain, the integrator gain being variable based upon the cabin rate error and a cabin pressure error; and a duty cycle limit look-up table providing the duty cycle limit, the duty cycle limit being variable based upon the cabin rate error and the cabin pressure error.

In another aspect of the present invention, a method for regulating the voltage delivered to a motor comprises looking up an integrator gain in an integrator gain look-up table, the integrator gain being variable based upon a cabin rate error and a cabin pressure error; looking up a duty cycle limit in a duty cycle limit look-up table, the duty cycle limit being variable based upon the cabin rate error and the cabin pressure error; receiving the product of the cabin rate error and the integrator gain into an integrator to provide an integral duty cycle command, the integrator having a saturation limit delimited by a duty cycle limit; and summing a proportional duty cycle command with the integral duty cycle command to provide an unlimited duty cycle command, wherein the unlimited duty cycle command corresponds to the voltage delivered to the motor.

In a further aspect of the present invention, a method for regulating the air pressure in an aircraft cabin comprises looking up an integrator gain in an integrator gain look-up table, the integrator gain being variable based upon a cabin rate error and a cabin pressure error; looking up a duty cycle limit in a duty cycle limit look-up table, the duty cycle limit being variable based upon the cabin rate error and the cabin pressure error; receiving the product of the cabin rate error and the integrator gain into an integrator to provide an integral duty cycle command, the integrator having a saturation limit delimited by a duty cycle limit; summing a proportional duty cycle command with the integral duty cycle command to provide an unlimited duty cycle command, wherein the unlimited duty cycle command corresponds to a voltage delivered to a motor; and spinning the motor to position an outflow valve at a position to regulate the air pressure in the aircraft cabin.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Briefly, the present invention provides a CPCS software control logic modification which may boost the voltage applied to a motor when conditions are sensed indicating a combination of larger than normal cabin pressure and cabin rate error conditions. The motor may be part of an open-loop system for operating a butterfly valve that may regulate outflow from the aircraft cabin to ambient pressure outside the aircraft cabin. The larger than normal cabin pressure and cabin rate error conditions may be an indication that the outflow valve is not responding in a normal manner, potentially caused by excessive loading to the motor or motor degradation. By boosting the motor voltage during excessive load conditions or with a degraded motor, CPCS performance and robustness may be improved.

Conventional, prior art CPCS design, as discussed above, which may limit the integrator duty cycle limit and the integrator gain, may result in, at best, a slow response to any larger than normal cabin pressure and cabin rate error conditions that may occur. The present invention, by providing look-up tables for integrator gain and duty cycle limits, the values of which may be based on, for example, the degree of the error condition, may allow an applied voltage to the motor to exceed the limits set forth in the CPCS design of the prior art. The design of the present invention may allow for prompt and effective response to these error conditions.

For example, if cabin altitude (rate and pressure) is increasing beyond what may be permitted under normal conditions (for example, cabin altitude is moving beyond 8000 feet), the voltage applied to the motor may be increased (and increased beyond the limits imposed by conventional logic design), allowing for a more rapid closure of the butterfly valve on the cabin outflow valve, thereby slowing the cabin rate and returning the cabin altitude to safe ranges (i.e., at or below 8000 feet).

As another example, if cabin altitude (rate and pressure) is increasing beyond what may be permitted under normal conditions (for example, cabin altitude is moving beyond 8000 feet) and such an increase is due to a motor deadzone, the voltage applied to the motor may be increased (and increased beyond the limits imposed by conventional logic design), to surpass the motor deadzone, thereby allowing the motor to control the outflow valve and safely regulate cabin altitude. Motor deadzones may be present in a motor and may be described as the range of voltages in which no speed response is achieved by the motor. Typical motor deadzones may be, for example, between 0.2 and 0.8V.

Figure 2:
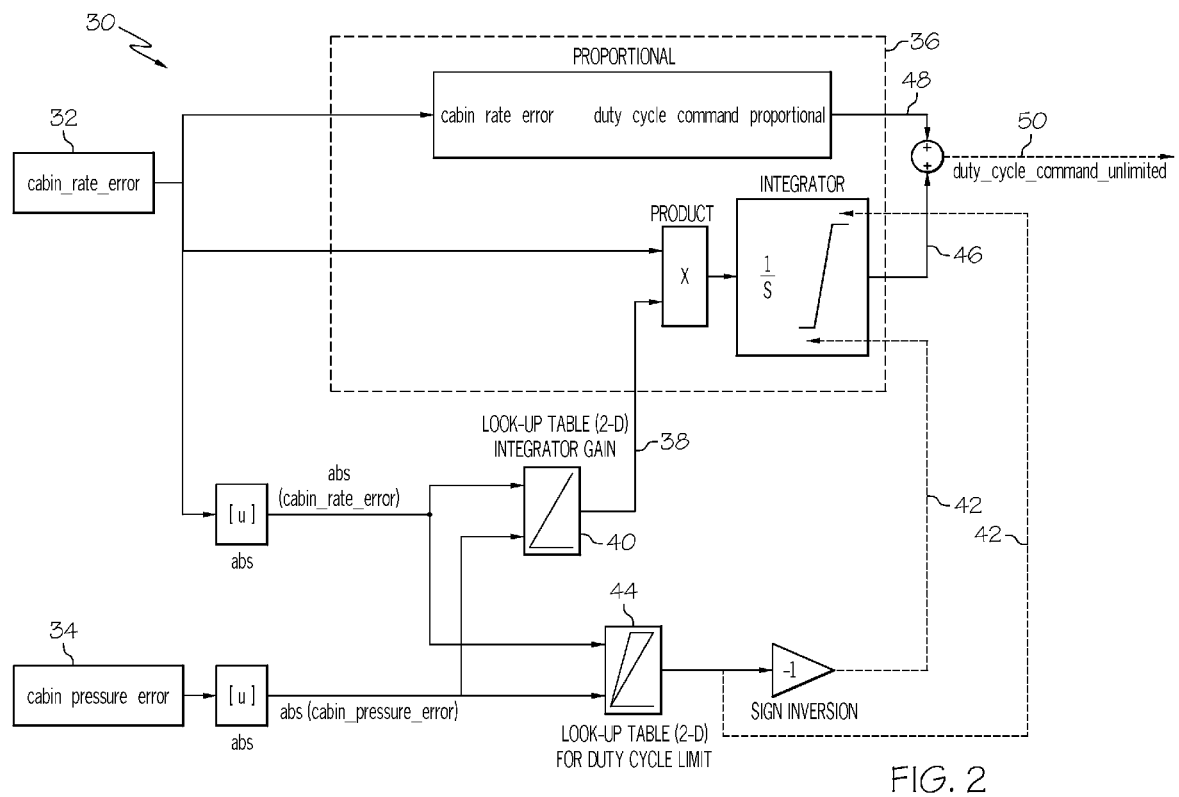
FIG. 2 is a block diagram showing a control law logic according to the present invention.

Referring to FIG. 2, there is shown a block diagram showing a control logic 30 according to the present invention. The input variables are the cabin rate error 32, which is the cabin rate command (not shown) minus the cabin rate actual (not shown); and the cabin pressure error 34, which is the cabin pressure command (not shown) minus the cabin pressure actual (not shown). Generally, the cabin pressure error is referenced in units relative to sea level, expressed in units of sea-level-feet.

Figure 1:
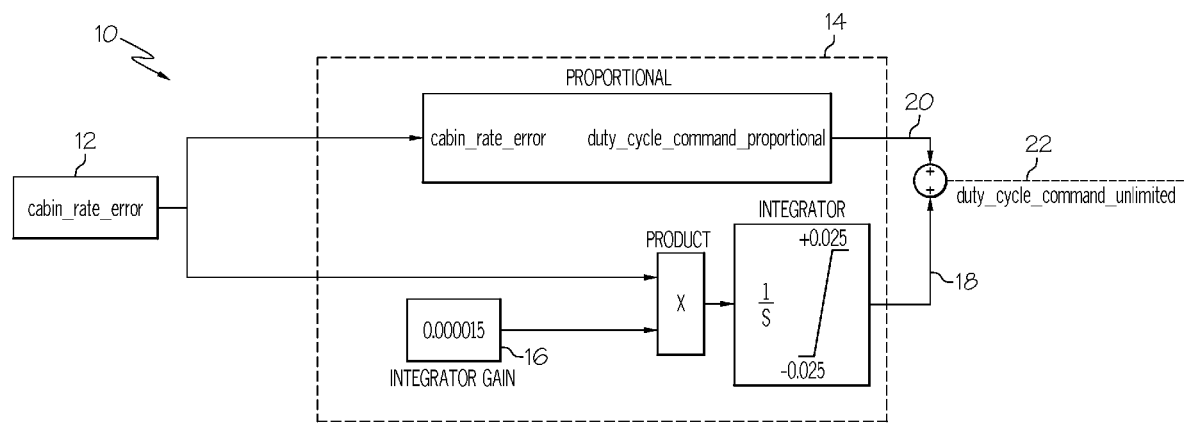
FIG. 1 is a block diagram showing a control law logic according to the prior art.

Similar to the conventional system as shown in FIG. 1, the cabin rate error 32 may be operated upon by a proportional-integral (PI) control scheme as designated by the dotted block 36. Unlike the conventional CPCS design, which may use a constant integrator gain and duty cycle limits, the PI control scheme 36 of the present invention, as discussed in more detail below, may obtain an integrator gain 38 from an integrator gain look-up table 40 and may obtain a duty cycle limit 42 from a duty cycle limit look-up table 44.

The cabin rate error 32 may be multiplied by the gain 38 and then integrated. The integrator output (the integral duty cycle command 46) may be limited to +/− the value of the duty cycle limit 42, as obtained from the duty cycle limit look-up table 44. A proportional duty cycle command 48, as is known in the art, may be summed with the integral duty cycle command 46 to provide an unlimited duty cycle command 50. This unlimited duty cycle command 50 may correspond to a certain voltage being applied directly to a motor to regulate a butterfly valve (not shown) in an open-loop system. The motor driven butterfly valve in an open-loop system may be similar to that described in U.S. Pat. No. 6,979,257, herein incorporated in its entirety by reference.

Figure 3:
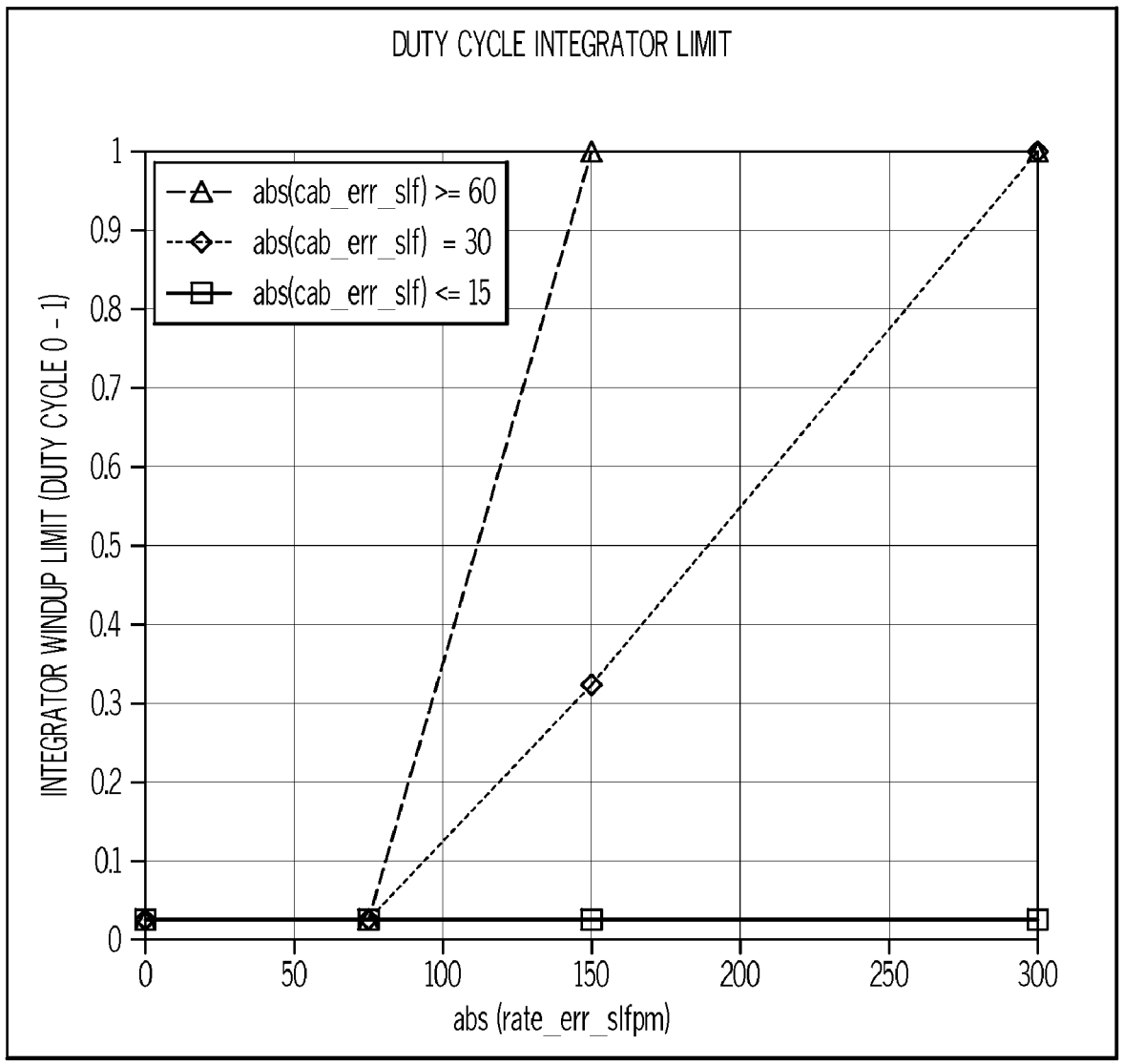
FIG. 3 is a graph showing one example of a look-up table for duty cycle integrator limits according to one embodiment of the present invention.
Figure 4:
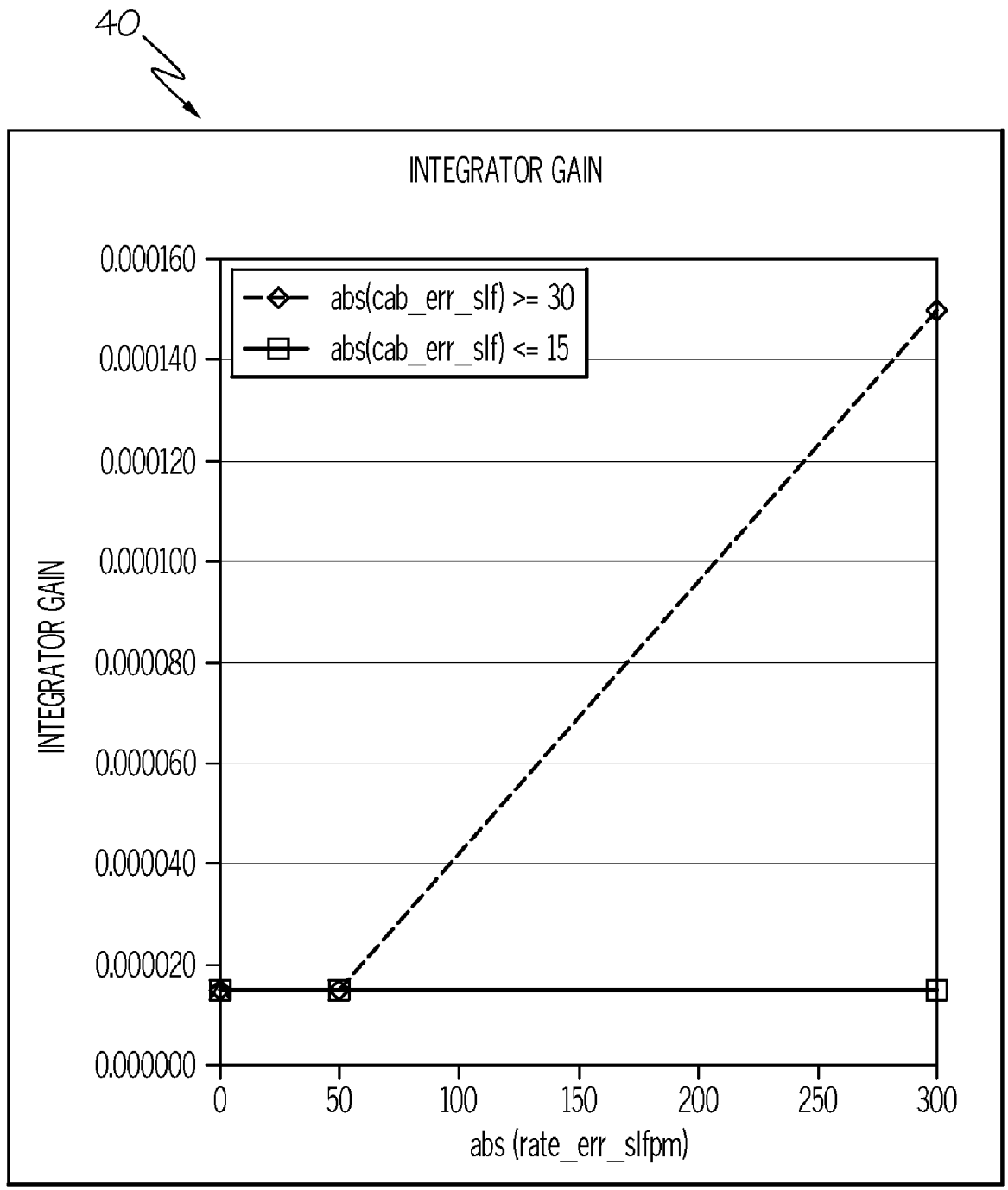
FIG. 4 is a graph showing one example of a look-up table for integrator gain according to one embodiment of the present invention.

Referring now to FIGS. 3 and 4, there are shown examples of the duty cycle limit look-up table 44 and integrator gain look-up table 40, respectively. The integrator gain 38 and the duty cycle limits 42 may be obtained from the integrator gain look-up table 40 and the duty cycle limit look-up table 44, respectively. The values of the integrator gain 38 and the values for the duty cycle limits 42 may vary based on the magnitudes of the cabin rate error 32 and the cabin pressure error 34.

Referring specifically to FIG. 3, a graph of the absolute value of the cabin rate error vs. the duty cycle limit (also known as integrator windup limit) is shown. The absolute values of the cabin pressure error and of the cabin rate error may be fed into the graph of FIG. 3. If the absolute value of the cabin pressure error 34 is greater than or equal to a first predefined limit (in this case, >=60 sea-level-feet), then the duty cycle limits 42 (see FIG. 2) are taken from the dashed line marked with triangles. If the absolute value of the cabin pressure error 34 is less than the first predefined limit, but greater than a second predefined limit (in this case, between 60 and 30 sea-level-feet), then the duty cycle limits 42 are taken by linearly interpolating between the lines corresponding to the first and second predefined limits, that is, between the dashed line marked with triangles and dotted line marked with diamonds. If the absolute value of the cabin pressure error 34 is exactly equal to the second predefined limit (in this case, 30 sea-level-feet), then the duty cycle limits 42 are taken from the dotted line marked with diamonds. If the absolute value of the cabin pressure error 34 is less than the second predefined limit, but greater than a third predefined limit (in this case, between 30 and 15 sea-level-feet), then the duty cycle limits 42 are taken by linearly interpolating between the lines corresponding to the second and third predefined limits, that is, between the dotted line marked with diamonds and the solid line marked with squares. Finally, if the absolute value of the cabin pressure error 34 is less than or equal to the third predefined limit (in this case, <=15 sea-level-feet), then the duty cycle limits 42 are taken from the solid line marked with squares. The absolute value of the cabin rate error may be used to determine the x-axis position along the corresponding line (triangle, diamond or square, based on the absolute value of the cabin pressure error as discussed above) to arrive at the duty cycle limit reading from the y-axis. The duty cycle limit look-up table 44 of FIG. 3 allows for a variable duty cycle limit 42 to be used in the PI control scheme 36 of FIG. 2.

Referring now specifically to FIG. 4, a graph of the absolute value of the cabin rate error vs. the integrator gain is shown. Similar to the duty cycle limit look-up table 44 of FIG. 3, the integrator gain look-up table 40 of FIG. 4 may receive inputs which are the absolute value of the cabin rate error 32 and the absolute value of the cabin pressure error 34. When the absolute value of the cabin pressure error 34 reaches a predetermined limit (in this case, 30 sea-level-feet or greater), the integrator gain 38 may be read from the line designated with diamonds. When the absolute value of the cabin pressure error 34 is less than 30 sea-level-feet but greater than 15 sea-level-feet, then the integrator gain 38 is taken by linearly interpolating between the line designated with diamonds and the line designated with squares. When the absolute value of the cabin pressure error 34 is less than or equal to 15 sea-level-feet, the integrator gain 38 may be read from the line designated with squares. The absolute value of the cabin rate error 32 may be used to determine the x-axis position along the corresponding line (diamond or square, based on the absolute value of the cabin pressure error as discussed above) to arrive at the integrator gain reading from the y-axis. The integrator gain look-up table 40 of FIG. 4 allows for a variable integrator gain 38 to be used in the PI control scheme 36 of FIG. 2.

In should be noted that the table values in FIGS. 3 and 4 may change across different CPCS applications. Moreover, the cutoffs for the various lines in the graphs (for example, 0-15, 15-30, 30-60 and 60 sea-level-feet or greater for the three lines (triangle, diamond and square) of the graph of FIG. 3) may change across different CPCS applications. Regardless of the absolute numbers used in the look-up tables 40, 44, it may be observed that the output table values of the integrator gain and the duty cycle limits increase as the cabin pressure error and the cabin rate error values increase. The net effect of increasing the gain is to increase the dynamic response of the integrator. The net effect of increasing the duty cycle limits is to permit a higher duty cycle command, hence, generating more voltage to the motor during sensed conditions of larger than normal cabin pressure error and cabin rate error.

Figure 5:
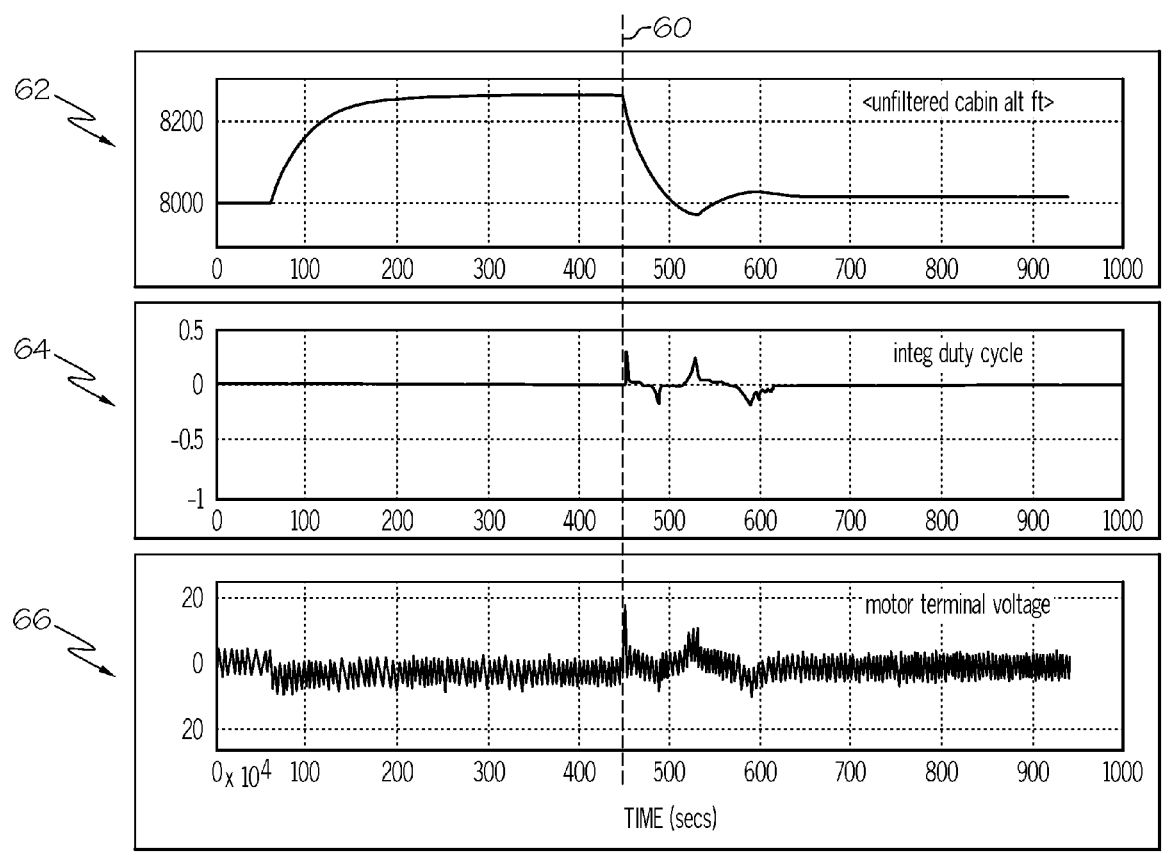
FIG. 5 is a series of graphs showing a simulation of CPCS performance, comparing conventional CPCS design with that of the present invention.

Referring to FIG. 5, there are shown a series of graphs showing math model simulation results when the motor has an 8V deadzone. The left side of the dotted line 60 shows performance under the conventional CPCS design and control logic described above with reference to FIG. 1. The right side of the dotted line 60 shows performance using the control logic of the present invention. In each graph 62, 64, 66, the x-axis refers to time.

In the top graph 62, the y-axis refers to cabin altitude (cabin pressure). As can be seen, under the conventional control logic, the cabin altitude may increase beyond 8200 feet. This out-of-control cabin pressure condition (sudden decrease in cabin pressure) may be caused by the 8V deadzone in the motor. The voltage applied to the motor under the conventional logic is less than the deadzone and, therefore, the motor does not spin. Under the control logic of the present invention, a higher than normal cabin pressure error may result in an integrator gain and duty cycle limits that are greater than those allowed under the conventional logic, thus permitting a voltage to the motor greater than 8V, overcoming the deadzone, allowing the motor to spin and, in turn, closing the butterfly valve.

The middle graph 64 shows the integrator duty cycle limits on the y-axis. Under the conventional control logic (left of the dotted line 60), the duty cycle limits are limited at +/−0.025. Under the control logic of the present invention (right of the dotted line 60), the duty cycle limits may go beyond the conventional limits in order increase the voltage applied to the motor in order to control the cabin altitude.

The bottom graph 66 shows the motor terminal voltage on the y-axis. Under the conventional logic, the motor terminal voltage is limited based on the integrator gain and the duty cycle limits, as discussed above. However, under the control logic of the present invention, the motor terminal voltage may be increased or decreased beyond the conventional limits, thereby allowing the terminal voltage to surpass, as is the case in this simulation, a larger than expected deadzone, thereby avoiding an out of control cabin pressure condition.

Figure 6:
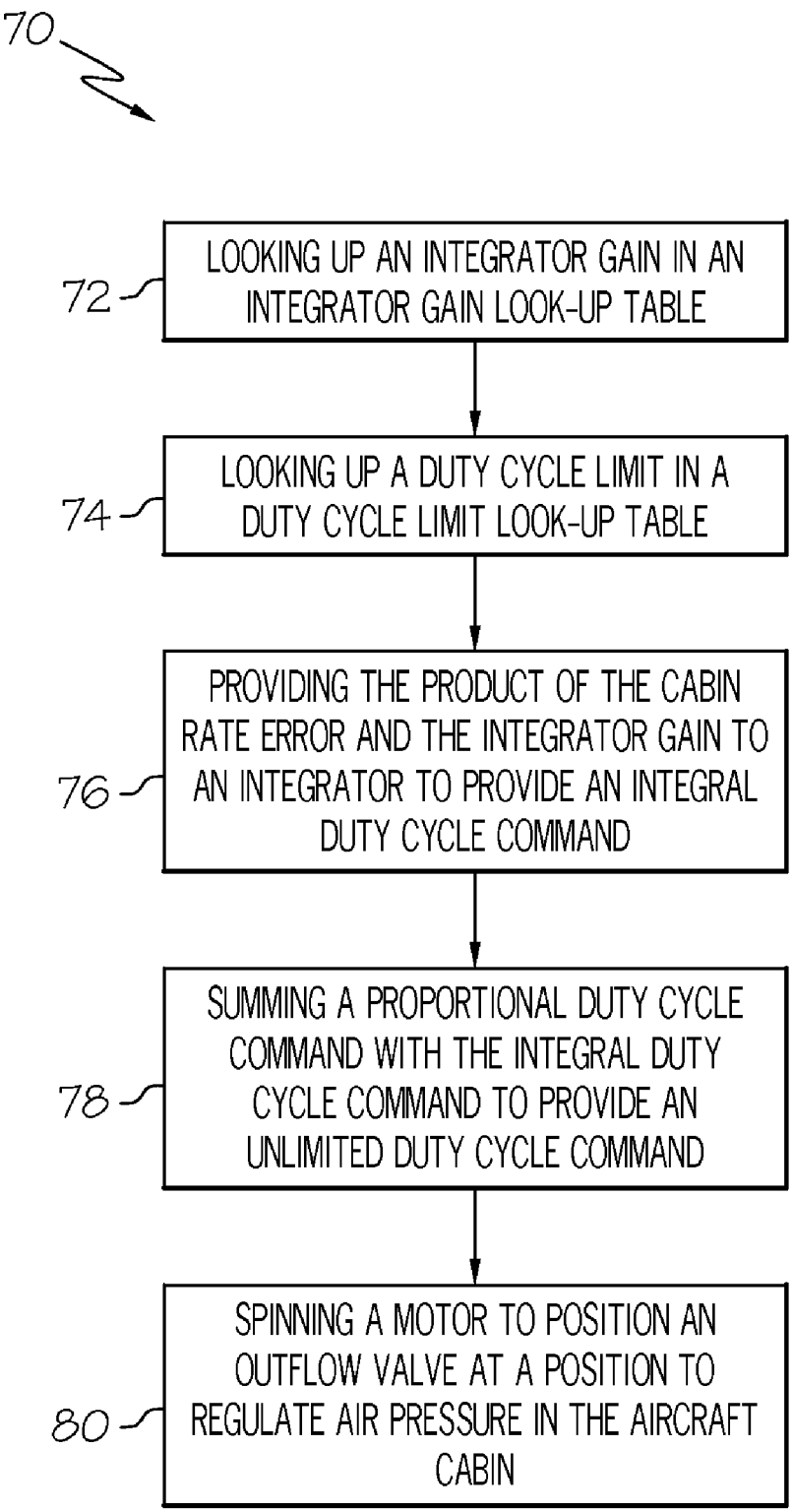
FIG. 6 is a flow chart describing a method according to one embodiment of the present invention.

Referring now to FIG. 6, there is shown a flow chart describing a method 70 for regulating the pressure in an aircraft cabin according to one embodiment of the present invention. A first step 72 may include looking up an integrator gain (e.g., integrator gain 38) in an integrator gain look-up table (e.g., integrator gain look-up table 40). The integrator gain may be variable based upon a cabin rate error and a cabin pressure error. A step 74 may be performed to look up a duty cycle limit (e.g., duty cycle limit 42) in a duty cycle limit look-up table (e.g., duty cycle limit look-up table 44). Similar to the integrator gain, the duty cycle limit may be variable based upon the cabin rate error and the cabin pressure error.

A PI control scheme may receive the product of the cabin rate error and the integrator gain into an integrator to provide an integral duty cycle command in a step 76. The PI control scheme may further sum a proportional duty cycle command with the integral duty cycle command to provide an unlimited duty cycle command in a step 78. The unlimited duty cycle command may correspond to a voltage delivered to a motor. The motor may be spun to position an outflow valve at a position to regulate the air pressure in the aircraft cabin in a step 80. The outflow valve may be, for example, a butterfly valve fluidly communicating the aircraft cabin with ambient pressure outside of the aircraft.

While the present invention has been described referring to regulating the pressure in an aircraft cabin, the present invention may be useful for regulating the pressure in any airborne vehicle having an enclosed fuselage (cabin), including commercial and/or military jets, helicopters, and the like. Moreover, while the present invention has been described above referring to the use of a butterfly valve for controlling air outflow, any motor driven valve assembly may be used. For example, the motor-driven valves of U.S. Pat. No. 6,962,324, herein incorporated by reference, may be used to control cabin outflow with the control logic of the present invention.

It should be understood, of course, that the foregoing relates to exemplary embodiments of the invention and that modifications may be made without departing from the spirit and scope of the invention as set forth in the following claims.

We claim:

1. A control logic for a cabin pressure control system, the control logic comprising:
   an integrator, the integrator receiving the product of a cabin rate error and an integrator gain to provide an integral duty cycle command, the integrator having a saturation limit delimited by a duty cycle limit, wherein the cabin rate error is a difference between a cabin command rate and a cabin actual rate;
   an integrator gain look-up table providing the integrator gain, the integrator gain being variable based upon the cabin rate error and a cabin pressure error; and
   a duty cycle limit look-up table providing the duty cycle limit, the duty cycle limit being variable based upon the cabin rate error and the cabin pressure error.

2. The control logic according to claim 1, further comprising a proportional-integral control scheme, wherein a proportional duty cycle command is summed with the integral duty cycle command to provide an unlimited duty cycle command, wherein the unlimited duty cycle command corresponds to a voltage delivered to a motor.

3. The control logic according to claim 1, wherein when the cabin pressure error is less than or equal to a first predefined limit, the duty cycle limit is constant at about 0.025.

4. The control logic according to claim 3, wherein the first predefined limit is about 15 sea-level-feet.

5. The control logic according to claim 3, wherein when the cabin pressure error is greater than or equal to a second predefined limit, the duty cycle limit increases with increasing cabin rate error.

6. The control logic according to claim 5, wherein the second predefined limit is about 60 sea-level-feet.

7. The control logic according to claim 5, wherein when the cabin pressure error is between the first predetermined limit and the second predetermined limit, the duty cycle limit increases with increasing cabin rate error, the increase in the duty cycle limit when the cabin pressure error is between the first predetermined limit and the second predetermined limit being less than the increase in the duty cycle limit when the cabin pressure error is greater than or equal to the second predefined limit.

8. The control logic according to claim 7, wherein when the cabin pressure error is between about 15 and about 60 sea-level-feet, the duty cycle limit increases linearly from about 0.025 to 1 over an absolute value of the cabin rate error from about 75 to about 300 slfpm.

9. The control logic according to claim 1, wherein when the cabin pressure error is less than a predefined limit, the integrator gain is constant at about 0.000015 (duty-cycle/second)/cabin_rate_error(slfpm).

10. The control logic according to claim 9, wherein when the cabin pressure error is greater than the predefined limit, the integrator gain increases with increasing cabin rate error.

11. The control logic according to claim 10, wherein when the cabin pressure error is greater than or equal to 30 sea-level-feet, the integrator gain increases from about 0.000015 to about 0.00015 (duty-cycle/second)/cabin_rate_error (slfpm) over an absolute value of the cabin rate error from about 50 to about 300 slfpm.

12. A method for regulating the voltage delivered to a motor, the method comprising:
   looking up an integrator gain in an integrator gain look-up table, the integrator gain being variable based upon a cabin rate error and a cabin pressure error, wherein the cabin rate error is a difference between a cabin command rate and a cabin actual rate;
   looking up a duty cycle limit in a duty cycle limit look-up table, the duty cycle limit being variable based upon the cabin rate error and the cabin pressure error;
   calculating the product of the cabin rate error and the integrator gain into an integrator to provide an integral duty cycle command, the integrator having a saturation limit delimited by the duty cycle limit;
   summing a proportional duty cycle command with the integral duty cycle command to provide an unlimited duty cycle command, wherein the unlimited duty cycle command corresponds to the voltage delivered to the motor; and
   controlling the motor to regulate the delivered voltage based on the cabin pressure.

13. The method according to claim 12, further comprising providing a constant duty cycle limit of about 0.025 when the cabin pressure error is less than or equal to a first predefined limit.

14. The method according to claim 13, further comprising providing an increased duty cycle limit when the cabin pressure error is greater than the first predefined limit.

15. The method according to claim 14, further comprising providing a further increased duty cycle limit when the cabin pressure error is greater than a second predefined limit, the first predefined limit being less than the second predefined limit.

16. A method for regulating the air pressure in an aircraft cabin, the method comprising:
   looking up an integrator gain in an integrator gain look-up table, the integrator gain being variable based upon a cabin rate error and a cabin pressure error, wherein the cabin rate error is a difference between a cabin command rate and a cabin actual rate;
   looking up a duty cycle limit in a duty cycle limit look-up table, the duty cycle limit being variable based upon the cabin rate error and the cabin pressure error;
   calculating the product of the cabin rate error and the integrator gain into an integrator to provide an integral duty cycle command, the integrator having a saturation limit delimited by the duty cycle limit;
   summing a proportional duty cycle command with the integral duty cycle command to provide an unlimited duty cycle command, wherein the unlimited duty cycle command corresponds to a voltage delivered to a motor; and spinning the motor to position an outflow valve at a position to regulate the air pressure in the aircraft cabin.

17. The method according to claim 16, further comprising:

providing a constant duty cycle limit of about 0.025 when the cabin pressure error is less than or equal to a first predefined limit;

increasing the duty cycle limit with increasing cabin rate error when the cabin pressure error is greater than or equal to a second predefined limit; and increasing the duty cycle limit with increasing cabin rate error when the cabin pressure error is between the first predetermined limit and the second predetermined limit, the increase in the duty cycle limit when the cabin pressure error is between the first predetermined limit and the second predetermined limit being less than the increase in the duty cycle limit when the cabin pressure error is greater than or equal to the second predefined limit.

18. The method according to claim 17, wherein the first predetermined limit is about 15 sea-level-feet and the second predetermined limit is about 60 sea-level-feet.

19. The method according to claim 17, further comprising:

providing a constant integrator gain when the cabin pressure error is less than a predefined limit; and increasing the integrator gain with increasing cabin rate error when the cabin pressure error is greater than the predefined limit.

20. The method according to claim 16, wherein the outflow valve is a butterfly valve fluidly communicating the aircraft cabin with ambient pressure outside the aircraft.

* * * * *